A. P. SEYMOUR.

Mop and Brush Holder.

No. 6,719. Reissued Oct. 26, 1875.

Witnesses

Chas. H. Smith

Harold Serrell

Inventor

Albert P. Seymour for L. W. Serrell att'y.

N. PETERS, PHOTO-LITHOGRAPHER, WASHINGTON, D. C.

UNITED STATES PATENT OFFICE.

ALBERT P. SEYMOUR, OF NEW BRITAIN, CONNECTICUT.

IMPROVEMENT IN MOP AND BRUSH HOLDERS.

Specification forming part of Letters Patent No. 155,469, dated September 29, 1874; reissue No. 6,719, dated October 26, 1875; application filed October 4, 1875.

*To all whom it may concern:*

Be it known that I, ALBERT P. SEYMOUR, of New Britain, in the county of Hartford and State of Connecticut, have invented an Improvement in Mop and Brush Holders, of which the following is a specification:

Brush-holders have been made with a swinging arm, operated upon by a screw-ring surrounding the handle-socket, and the parts of a brush-holder have also been made to close upon the wicking or other fibrous material forming the mop.

My invention consists in a swinging jaw upon an arm against which the screw-ring acts, in one case to move the arm *f* when grasping a brush, and in the other case to move the same when grasping the mop. In either instance the part acted upon is inclined in order that the screw-ring may exert a greater force as it presses against the inclined surface of the arm. The surfaces of the jaws are V-shaped, and made with teeth, and the edge of one jaw is opposite to or overlaps the groove in the next, so as to clamp the mop very firmly.

Figure 1:
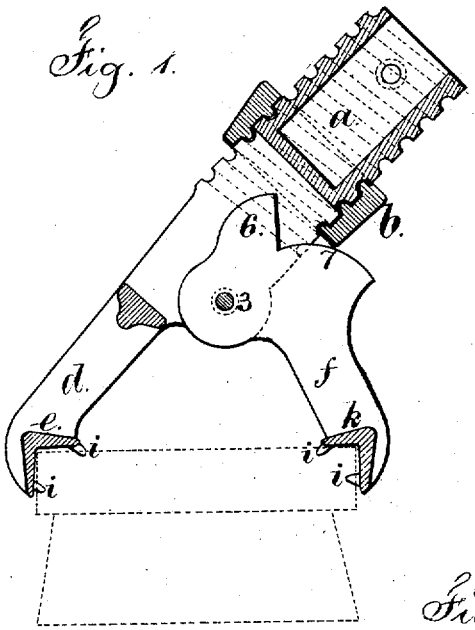
Figure 2:
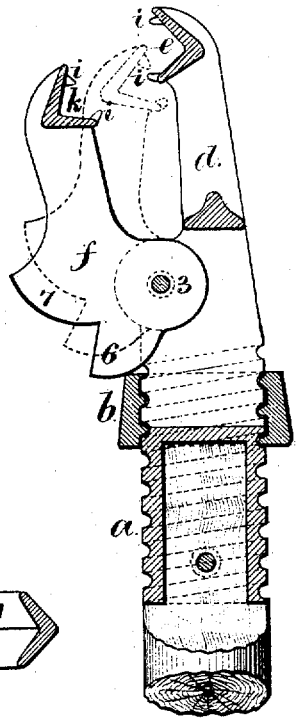
Figure 3:
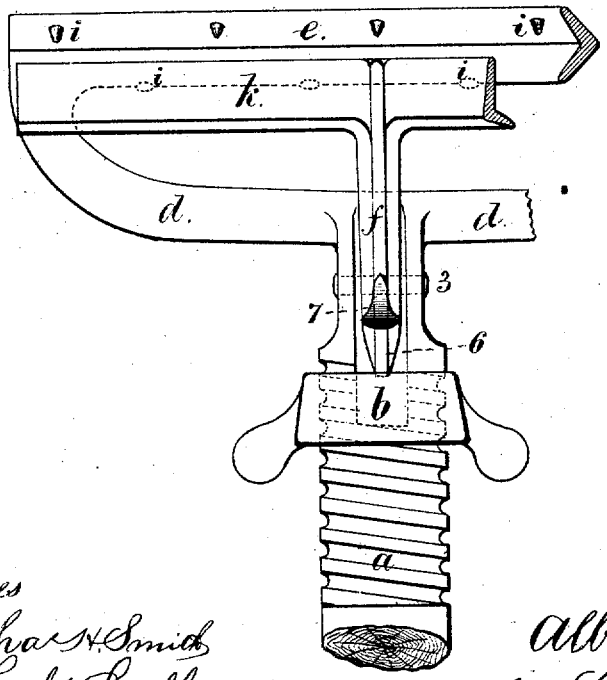

In the drawing, Figure 1 is a vertical section of the holder with a brush. Fig. 2 is a section of the parts with a mop; and Fig. 3 is a side elevation.

The socket *a* receives the wooden handle, as usual, and it has on its exterior surface a screw-thread and a ring-nut, *b*. The end of the socket is made with arms *d*, between which is the V or trough shaped jaw *e*, preferably provided with teeth *i*. In the socket *a* is a mortise, into which the arm *f* passes, and is attached by the rivet or pin 3, on which said arm *f* and the trough-shaped jaw *k* swing. The length of this arm *f* should be such that the trough-jaw *k* receives the edge 4 of the jaw *e* when closed, so as to crimp the mop material and hold it very securely in place. The toes or portions 6 and 7 on the arm *f*, against which the screw-ring *b* acts when in the respective positions shown in Figs. 1 and 2, are inclined, and hence said screw-ring exerts a powerful force upon the arm *f* to clamp either a mop or a brush head, because the screw-ring presses against the inclined surface, and such surface tends to press the ring against the surface of the screw-socket, instead of tending only to move the screw-ring lengthwise of the socket; hence there will be but little wear or strain upon the screw-thread.

The screw-socket clamps by the cam or incline 6 when a mop is used with the holder, and by the portion 7 when a brush-head is placed between the jaws, and, for a larger brush, a third incline may be provided to allow the jaws to open wider.

I do not claim a mop and brush holder in which the swinging jaw is actuated by a separate lever and screw-ring.

I claim as my invention—

1. A mop or brush holder, made with a stationary jaw and screw-socket, a movable jaw and its arm swinging upon a pivot, and a screw-ring that acts against the swinging arm at one place when holding the brush, and at another place when holding the mop, substantially as set forth.

2. The mop-holder, made of two metal trough-shaped jaws, a screw-socket, ring-nut, and swinging arm *f*, against which the ring-nut acts, substantially as set forth.

Signed by me this 30th day of September, 1875.

ALBERT P. SEYMOUR.

Witnesses:

CHARLES PECK,
SAML. BASSETT.